J. Goodyear, Jr., & T. J. Berry,

Roach Trap.

N°. 14,336.   Patented Feb. 26, 1856.

Witnesses;

Inventors;
John Goodyear Jr
Thomas J. Berry

UNITED STATES PATENT OFFICE.

JNO. GOODYEAR, JR., AND THOS. J. BERRY, OF PHILADELPHIA, PENNSYLVANIA, ASSIGNORS TO JNO. GOODYEAR, JR., THOS. J. BERRY, AND WM. M. PORTER.

ROACH-TRAP.

Specification of Letters Patent No. 14,336, dated February 26, 1856.

*To all whom it may concern:*

Be it known that we, JOHN GOODYEAR, Jr., and THOMAS J. BERRY, of the city of Philadelphia and State of Pennsylvania, have invented a new and Improved Trap for Catching Roaches and other Like Insects; and we do hereby declare that the following is a full, clear, and exact description of the construction and operation of the same, reference being had to the accompanying drawings, in which—

Figure 2:
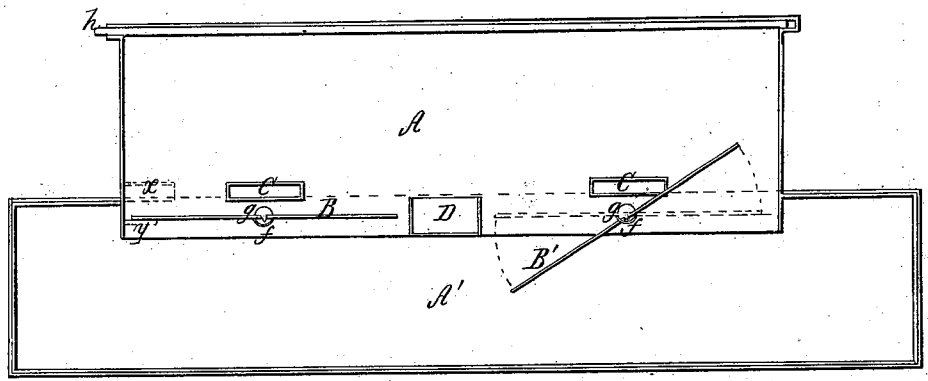
Figure 3:
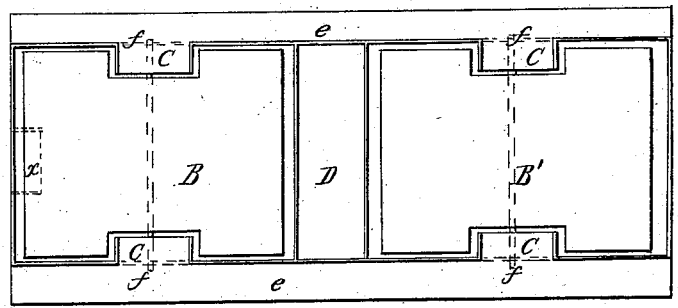
Figure 1:
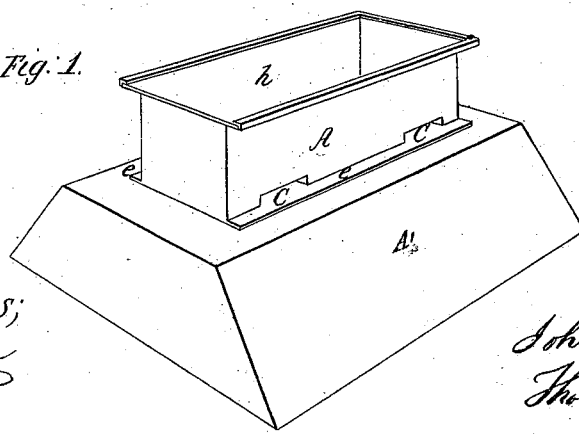

Figure 1, is a perspective view; Fig. 2, a vertical longitudinal section through the middle of the same; and Fig. 3, a sectional plan view, like letters indicating the same parts, in all the figures.

The nature of our invention consists in a double box having falls and flat tubes of entrance so arranged and acting in relation to each other, that the insects may readily enter the box and thus become entrapped or prevented from making their escape therefrom.

Referring to the drawings A, A', is the two part box, constituting the body of the trap; B B' the falls; and C—C, the flat, entrance tubes—D, being a trough for holding the bait.

The lower box, or retaining chamber (A') is made about 8 inches long, 4 wide and 2 high, a flange (*e*) being attached on its two outer sides about half an inch from its lower edge, so as to support the same within the opening made in the upper side of the lower box as shown in the drawings. Through each side of this receiving chamber, the flat tubes (C—C) are fixed in horizontal positions so as to be flush on the outside and to project about half an inch on the inside of the box, their lower inner sides being on a line, or plane, with the upper surfaces of the flanges (*e*) as shown in the drawings. These tubes are each about ¾ths of an inch wide and $\frac{3}{16}$ths of an inch high on the inside, or, of just sufficient height to easily admit a full-grown roach or other like insect. About a quarter of an inch below these tubes the falls (B, B',) are suspended upon knife-edge fulcra (*f—f*) which are fixed across their under sides respectively and rest at their ends in roomy holes (*g—g*) made in the sides of the box, so as to tilt easily (as shown in B') in either direction, by the weight of the insect when the latter approaches either end of the fall, and so that when the said falls are not so acted upon, or, left to themselves, shall attain to and rest in horizontal positions—the same being made so as not to touch, at any time, the tubes (C—C) nor the sides nor ends of the box and bait trough. The bait trough (D) is made open at the top and is fixed across the middle of the box (A) between the two falls; and the tubes (C—C) so as to have their inner openings just above the fulcra shafts of the falls respectively, as shown in the drawings.

The upper side of the receiving box (A) consists of a draw-lid (*h*) arranged so as to afford access to the interior when required, for putting in the bait, and should be of glass so as to admit light—the rest of the receiving box, including the falls, being made of tin plate or other hard smooth substance which will prevent the insects from fixing themselves upon its surface. The retaining chamber (A') may be made of tin plate, with glass to admit light; or, it may be made wholly of glass—and in either case, the outsides of the inclines made rough by paint or sand so as to afford a hold for the insects in ascending the same.

As a modification of the construction, the entrance tubes may be placed so as to land the entering insect upon the near end of the fall, the latter in such case, being supported at this end by a projection so as to be prevented from yielding downward by the weight of the insect, as shown by the dotted lines *x* and *y*.

Operation: The bait being placed in the trough (D), the trap is placed upon its bottom in a horizontal position in the place infested by the insects. In due time, seeking food they will crawl up the planes, enter the tubes (C) and thus reach the middle of the falls, and approaching the bait trough, the respective falls tilt by their weight and, usher them into the close retaining chamber below, and from which they cannot escape—the falls respectively returning immediately to their former horizontal positions, ready for the reception of the next customer. Should the insect desire to return, on its reaching the fall, as is sometimes the case with the knowing ones, on their perceiving its vibratory character—the inner opening of the tube being some distance above the middle of the fall as before described, the insect directs its efforts beneath it; and in the case of roaches (for which insects the trap is more especially designed) from the inclined position they must place themselves, in order to reach it, in connection with their long antelar projections, they are prevented from re-entering the tubes, and others entering from the outside, they are all finally tilted into the retaining chamber below. Thus in the space of one night two or three hundred of these troublesome insects have been secured in one trap. By lifting out the receiving chamber (A), an opening is afforded in the retaining chamber (A′) through which the entrapped are discharged and destroyed.

We do not claim either the falls, tubes, or boxes, separately considered; nor do we confine our claim to the precise form and construction of the body of the trap; nor to the precise number or form of the tubes and falls, as these may be varied to suit circumstances; but

What we claim as our invention and desire to secure by Letters Patent is—

The tubes (C—C) and the falls (B or B′) when the same are arranged and operate together substantially in the manner and for the purpose set forth and described.

JOHN GOODYEAR, Jr.
THOMAS J. BERRY.

Witnesses:
WM. MORRISON,
JOHN B. KENNEY.